United States Patent
Sugano et al.

[11] Patent Number: 5,748,600
[45] Date of Patent: May 5, 1998

[54] ROTATIONAL OPTICAL HEAD FOR OPTICAL RECORDING MEDIUM

[75] Inventors: Manabu Sugano; Susumu Nomura; Naoharu Yanagawa; Hiroshi Suzuki, all of Tokorozawa, Japan

[73] Assignee: Pioneer Electronic Corporation, Japan

[21] Appl. No.: 632,339

[22] Filed: Apr. 10, 1996

[30] Foreign Application Priority Data

Apr. 11, 1995 [JP] Japan ..................... 7-110225

[51] Int. Cl.⁶ ..................................... G11B 7/00
[52] U.S. Cl. ................ 369/112; 369/44.14; 369/44.26; 360/2; 360/86
[58] Field of Search ................. 369/44.26, 112, 369/44.14, 44.12, 44.23; 359/212, 220, 213, 214; 250/236; 360/2, 86, 77.02

[56] References Cited

U.S. PATENT DOCUMENTS 5,216,247  6/1993  Wang et al. .................. 359/212

FOREIGN PATENT DOCUMENTS

2-230517  9/1990  Japan.

*Primary Examiner*—David C. Nelms
*Assistant Examiner*—Kim-Kwok Chu
*Attorney, Agent, or Firm*—Fish & Richardson P.C.

[57] ABSTRACT

A pickup apparatus of an optical card has an improved data transfer efficiency and miniaturization and thin shape of the apparatus can be realized. The length of a line segment connecting a center of an objective lens provided in a rotational optical unit and a center of a rotary drum is set to a length specified by a length in the major side direction on a recording surface of the optical card and $(1+\cos\theta/2)$. An optical pickup apparatus has: a fixed optical unit SOP; a rotary drum in reflecting mirrors for guiding a light beam B emitted from the fixed optical unit SOP to a recording surface of an optical card and an objective lens are mounted; and a rotational optical unit ROP having a rotary motor for rotating the rotary drum, wherein information is recorded and reproduced to and from the recording surface of the optical card. A length of a line segment connecting the center of the objective lens and the center of rotation of the rotary drum is decided on the basis of a length in the major side direction on the recording surface of the optical card and $(1+\cos\theta/2)$.

6 Claims, 9 Drawing Sheets

ROTATIONAL OPTICAL HEAD FOR OPTICAL RECORDING MEDIUM

BACKGROUND OF THE INVENTION

1. Field of the Invention

The present invention relates to an optical pickup apparatus and, more particularly, to an optical pickup to record and reproduce information to and from a card-shaped recording medium.

2. Description of Background Information

Hitherto, optical disc is widely known as a recording medium for recording and reproducing audio and video signals.

In the case of an optical disc, although a high recording density can be realized, its recording capacity is limited to a small level when considered as the whole disc, because the usable recording area in a disc is relatively small.

On the other hand, in the case of tape-shaped recording medium such as a magnetic tape or the like which is used for a VTR (Video Tape Recorder) or the like, its recording density is lower than that of the optical disc. Regarding the recording capacity, however, the tape-shaped recording medium can record information having an amount that is about 100 times as large as that in the optical disc.

Therefore, a compact recording medium having a large recording capacity can be realized by combining an optical recording density performance of the optical disc and a large recording capacity performance of the tape-shaped recording medium.

Hitherto, therefore, attempts have been made to record and reproduce information by using a laser beam to, for example, a tape-shaped optical recording medium (hereinafter, referred to as an optical tape) in which a magneto-optical recording film of TbFeCo or the like is formed like a base film shape in a manner similar to a magnetic tape.

Figure 11:
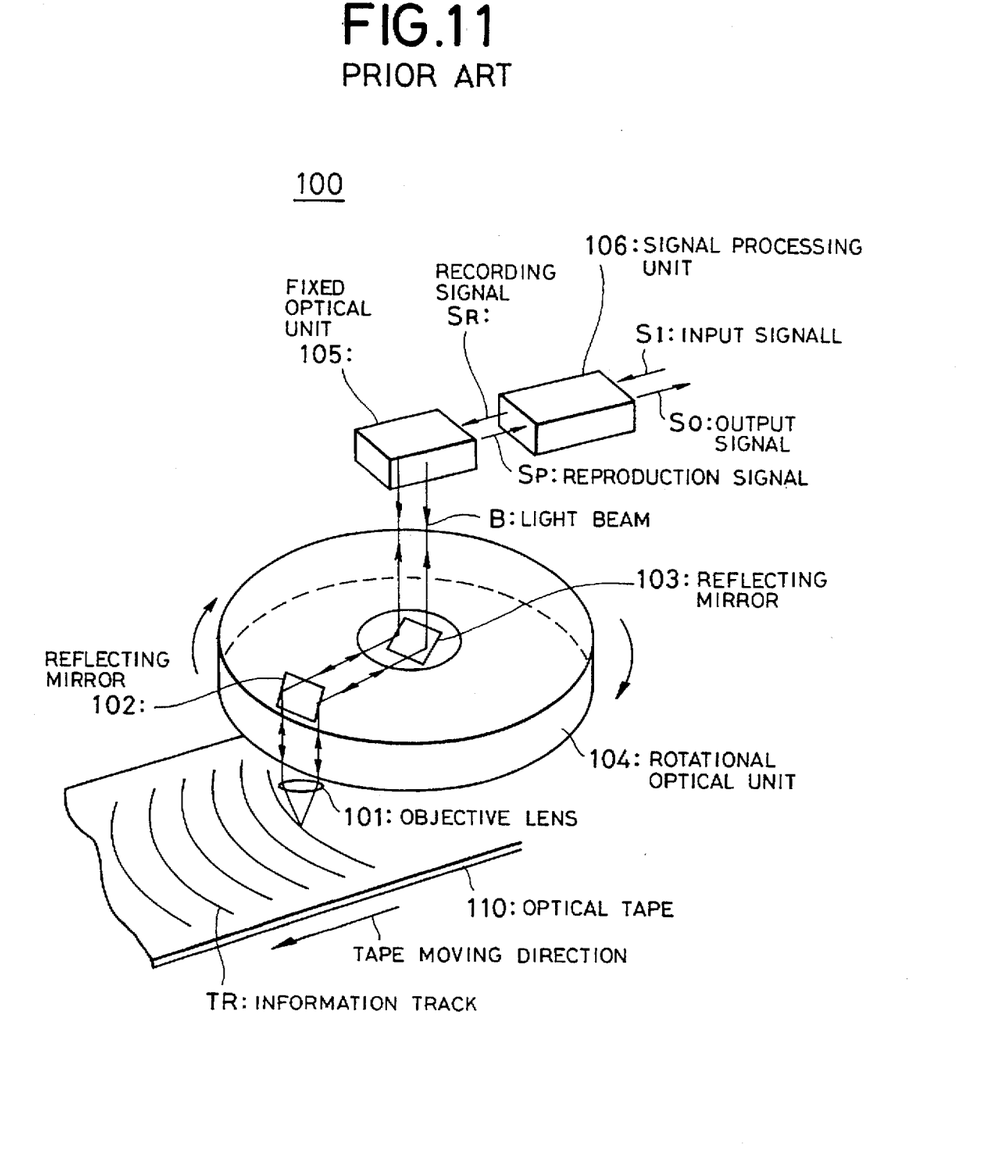
FIG. 11 is a diagram showing a pickup apparatus for an optical tape of the prior art.

In the prior art, a schematic construction of a pickup apparatus for recording and reproducing information to and from an optical tape is shown in FIG. 11.

As shown in FIG. 11, a pickup apparatus 100 of the prior art is constituted by: a signal processing unit 106 for processing an input signal SI to be recorded from the outside, converting to a recording signal SR, and outputting the converted signal to a fixed optical unit 105 and also for processing a reproduction signal SP from the fixed optical unit 105 and outputting the processed signal as an output signal SO to the outside; the fixed optical unit 105 which includes a light beam emitting apparatus for emitting a light beam B (light beam for recording) to record information onto an optical tape 110 when recording the information on the basis of the recording signal SR and a light beam B (light beam for reproduction) when reproducing the information and a light receiving apparatus for receiving a reflected light from the optical tape 110 of the light beam B (light beam for reproduction) when reproducing the information and outputting the reproduction signal SP; a rotational optical unit 104 rotating in a plane of rotation that is parallel with a recording surface of the optical tape 110 and is used for converging the light beam B (light beam for recording) emitted from the fixed optical unit 105 upon recording and for guiding the reflected light of the light beam B (light beam for reproduction) from the optical tape 110 to the fixed optical unit 105 upon reproduction while rotating; and a magnet MG to apply a magnetic field onto the optical tape 110 when recording or reproducing the information.

The rotational optical unit 104 has a construction including: reflecting mirrors 102 and 103 which form optical paths for guiding the light beam B (light beam for recording) emitted from the fixed optical unit 105 to an objective lens 101 upon recording and for guiding the reflected light of the light beam B (light beam for reproduction) from the optical tape 110 to the fixed optical unit 105 upon reproduction; and the objective lens 101 for converging the light beam B onto a recording surface of the optical tape 110. The rotational optical unit 104 is rotated by a driving apparatus (not shown) in a manner such that the reflecting mirrors 102 and 103 and objective lens 101 are integrated and the plane of rotation is parallel with the recording surface of the optical tape 110.

Figure 12:
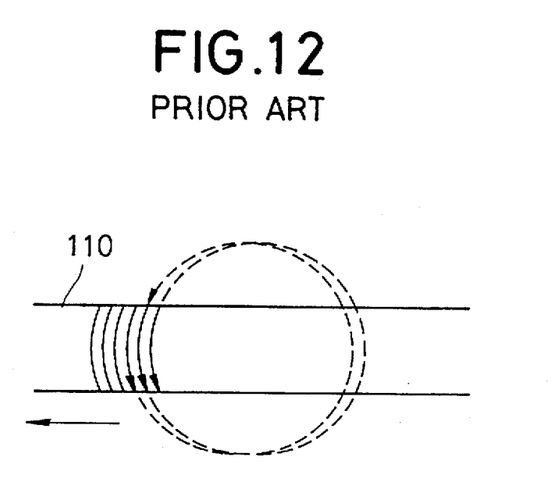
FIG. 12 is a diagram showing an example of an optical-tape-shaped recording pattern in the prior art.

As shown in FIG. 12, information is recorded onto the information recording surface by the pickup apparatus 100 with the construction described above, while forming an almost arcuated information track TR in the width direction on the optical tape 110. When reproducing the information, the recorded information is read out by the light beam B (light beam for reproduction) which is irradiated so as to trace the information track TR.

By using the pickup apparatus 100 of the prior art, the information can be recorded onto the optical tape 110 at a high recording density and the recorded information can be reproduced, so that the information recording and reproduction which is compact in size and large in capacity using the optical tape can be performed.

It is conceivable to apply, to the optical card, the technique for storing/reproducing information to and from the optical tape. The optical card is a recording medium in which a recording surface made of a magneto-optical material of TbFeCo or the like which is used for the optical tape is formed in a card (rectangular) shape. As for the recording/reproduction of information for the optical card, in a manner similar to the recording/reproduction of information in the optical tape, information is recorded so as to form an arcuated information track in the minor side direction of the optical card by rotating the rotational optical unit by using an axis perpendicular to the recording surface as a center of the rotation, and the information is read out by the reflected light from the recording surface of a read beam which is irradiated to trace the information track.

Various applications have been considered for the optical card which can be used as a small sized medium providing a large recording capacity. If a reduction in size and thickness is realized for the pickup apparatus itself which is used for recording and reproducing to and from the optical card, the range of its application can be further widened. However, as shown in FIG. 11, when attempting to perform the recording/reproduction for the whole length of the optical card by using the recording/reproducing technique of the optical tape, a relative position of the rotational optical unit and the optical card has to be moved by at least a distance in the major side direction of the recording surface of the optical card. This, as a result, poses a limit in reducing the size of the apparatus.

In the recording and reproducing technique of the optical tape, since a recording portion on the recording medium is limited within an arcuated range which is specified by a predetermined sector angle (for example, 90°; hereinafter, referred to as a recording angle), a transfer efficiency of data when recording reproducing the data is low.

Figure 13:
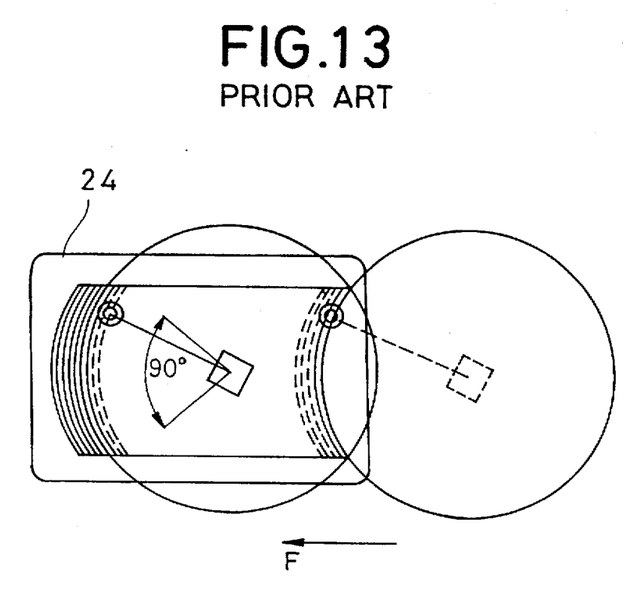
FIG. 13 is a diagram showing an example of a recording pattern in case of recording onto the optical card by using a pickup for an optical tape in the prior art.

In an example of FIG. 13, data can be transferred only during a time period of about ¼ of a time period during which the rotational optical unit makes one revolution. Although a transfer rate of data can be improved by increasing a rotational speed of the rotational optical unit, a transfer efficiency of data cannot be improved.

OBJECTS AND SUMMARY OF THE INVENTION

The present invention has been made in view of the problems discussed above, and it is an object of the invention to provide a pickup apparatus of an optical card which allows a significant reduction in size.

Another object of the invention is to provide a pickup apparatus for optical card which has an improved data transfer efficiency.

According to the first aspect of the invention, a pickup apparatus of an optical card comprises: a fixed optical unit; an objective lens for converging a light beam for recording and reproduction of information emitted from the fixed optical unit onto an almost rectangular recording surface of a card-shaped recording medium; light beam guiding means for guiding the light beam to the recording surface through the objective lens and for guiding a reflected light of the light beam from the recording surface to the fixed optical unit; a rotational optical unit which is rotated in a manner such that the objective lens and the light beam guiding means are rotated integrally and a line perpendicular to the recording surface is set as a center of rotation; and relative position changing means for changing a positional relation of the recording surface and the center of rotation along the major side direction on the rectangular recording surface, wherein when a recording angle on the recording surface is set to θ, a length of a line segment connecting the center of the objective lens and the center of rotation of the rotational optical unit is decided on the basis of a length on the major side direction on the recording surface and (1+cosθ/2).

According to the second aspect of the invention, a pickup apparatus of an optical card comprises: a fixed optical unit including beam forming means for forming a light beam for recording and reproducing information in accordance with a control signal; an objective lens for converging the light beam emitted from the fixed optical unit onto an almost rectangular recording surface of a card-shaped recording medium; light beam guiding means for guiding the light beam to the recording surface through the objective lens and for also guiding a reflected light of the light beam from the recording surface to the fixed optical unit; a rotational optical unit which is rotated in a manner such that the objective lens and the light beam guiding means are rotated integrally and a line in a portion near a center of the minor side direction on the recording surface and perpendicular to the recording surface is set as a center of rotation; relative position changing means for changing a positional relation of the recording surface and the center of rotation along the major side direction on the rectangular recording surface; position detecting means for detecting a rotating position of the rotational optical unit; and control means for forming the light beam by the control signal when the position detecting means detects that the rotating position of the rotational optical unit exists within a range of a predetermined angle and detects that the rotating position exists within a range of an angle symmetrical with the predetermined angle for the center of rotation.

According to the third aspect of the invention, a pickup apparatus of an optical card comprises: means for forming a light beam for recording and reproducing information; a fixed optical unit including servo control means for adjusting a beam position of the light beam on an almost rectangular recording surface of a card-shaped recording medium; an objective lens for converging the light beam emitted from the fixed optical unit onto the recording surface; light beam guiding means for guiding the light beam onto the recording surface through the objective lens and for guiding a reflected light of the light beam from the recording surface to the fixed optical unit; a rotational optical unit which is rotated in a manner such that the objective lens and the light beam guiding means are rotated integrally and a line that exists in a portion near the center in the minor side direction on the recording surface and that is perpendicular to the recording surface is set as a center of rotation; relative position changing means for changing a positional relation of the recording surface and the center of rotation along the major side direction in the rectangular recording surface; and position detecting means for detecting a rotational position of the rotational optical unit, wherein when at least the position detecting means detects that the rotating position of the rotational optical unit exists within a range of a predetermined angle and detects that the rotating position exists within a range of an angle symmetrical with the predetermined angle for the center of rotation, the servo control means is adjusted to a predetermined servo gain.

According to the fourth aspect of the invention, in the pickup apparatus of the optical card according to the third aspect of the invention, the servo control means performs a pull-in operation of the servo in a servo pull-in region formed on the card-shaped recording medium in the minor side direction of the recording surface.

According to the fifth aspect of the invention, in the pickup apparatus of the optical card according to the third aspect of the invention, the servo control means has a structure including focusing servo means for performing a focusing control to the recording surface of the light beam.

According to the sixth aspect of the invention, in the pickup apparatus of the optical card according to the third aspect of the invention, the servo control means is constructed by using tracking servo means for controlling a tracking to an information track on the recording surface of the light beam.

According to the first aspect of the invention, when a recording angle on the recording surface is set to θ, a length of the line segment connecting the center of rotation in the rotational optical unit and the center of the objective lens is decided on the basis of the length in the major side direction of the recording surface and (1+cosθ/2). A using efficiency of the optical card can be, therefore, improved and a relative moving distance of the rotational optical unit and the optical card is set to merely about the half in the major side direction of the optical card, so that the apparatus can be miniaturized.

According to the second aspect of the invention, when the objective lens in the rotational optical unit exists within a range of a predetermined recording angle on the recording surface of the optical card and within a range of an angle symmetrical with the predetermined recording angle for the center of rotation of the rotational optical unit, the light beam is irradiated, so that a transfer efficiency of data per rotation of the rotational optical unit can be improved.

According to the third aspect of the invention, when the objective lens in the rotational optical unit exists within a range of a predetermined recording angle on the recording surface of the optical card and within a range of an angle symmetrical with the predetermined recording angle for the center of rotation of the rotational optical unit, since the servo control means for adjusting the position of the light beam is adjusted to a predetermined servo gain, even if the servo gain is reduced in an intersecting portion of the recording track in an outer edge portion of the optical card, a stable servo control is performed in a predetermined recording region that is specified by the recording angle.

According to the fourth aspect of the invention, a servo pull-in region is provided in the minor side direction on the rectangular recording surface of the optical card and the servo control means for performing a pull-in operation of the servo in the servo pull-in region is used, so that the information can be recorded and reproduced in a state in which the servo control is certainly executed in the recording region of the information.

According to the fifth aspect of the invention, since the servo control means is constructed by the focusing servo means, the focusing control of the light beam is certainly performed on the recording surface.

According to the sixth aspect of the invention, since the servo control means is constructed by the tracking servo means, the tracking control of the light beam for the recording track is surely performed.

DETAILED DESCRIPTION OF THE PREFERRED EMBODIMENTS

First embodiment

The first embodiment of the invention will now be described hereinafter with reference to FIGS. 1 to 6. It is assumed that information is recorded and reproduced to and from an optical card being used, by means of a magneto-optical method.

The whole structure of a pickup apparatus of an optical card of the first embodiment will be first explained with reference to FIG. 1.

Figure 1:
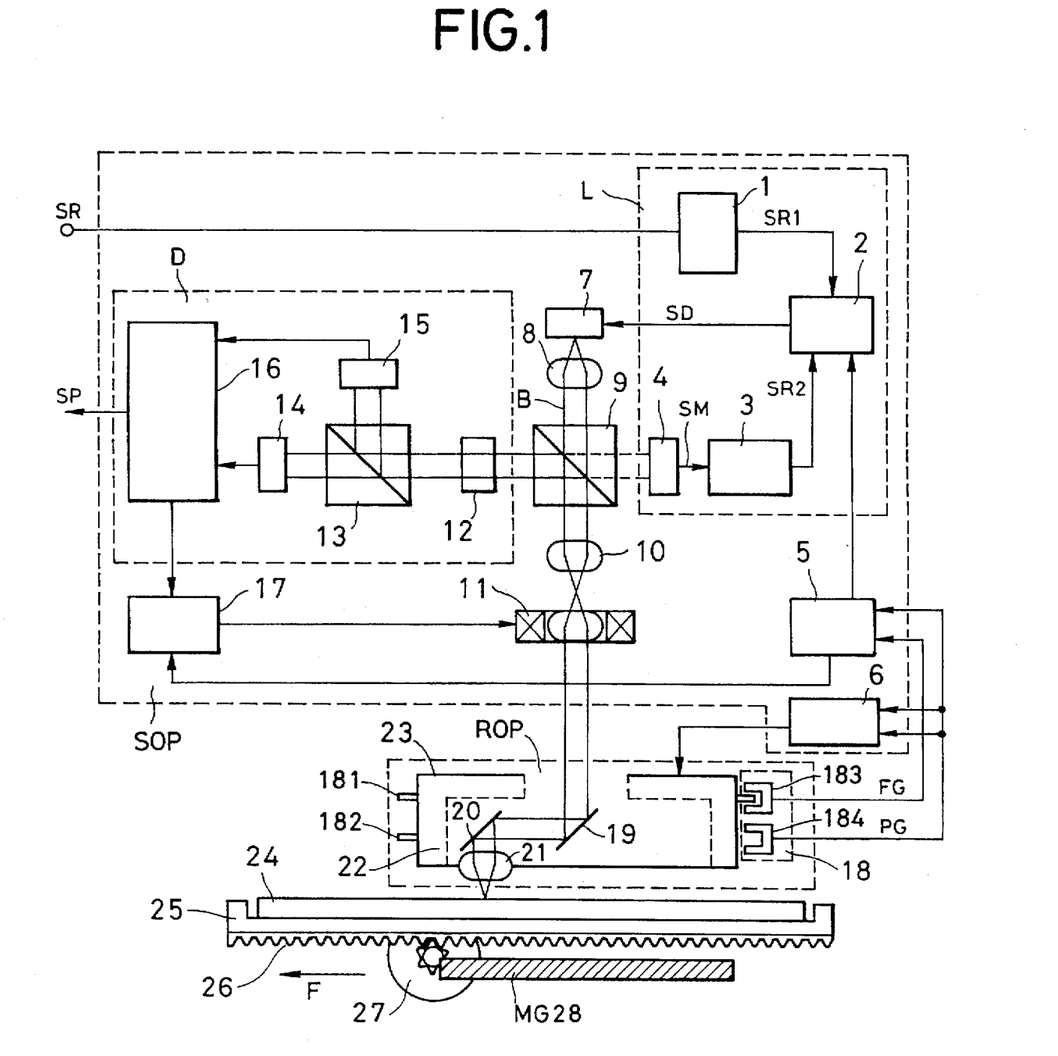
FIG. 1 is a diagram schematically showing the structural block of an optical pickup apparatus of the first embodiment.

As shown in FIG. 1, the pickup apparatus of the optical card of the first embodiment is constructed by: a fixed optical unit SOP including a laser diode for emitting the light beam B (light beam for recording) to record information onto an optical card 24 on the basis of the recording signal SR from a signal processing unit (not shown) when information is recorded and for emitting the light beam B (light beam for reproduction) to reproduce the information when the information is reproduced and a photosensitive device serving as light receiving means for receiving a reflected light of the light beam B (light beam for reproduction) from the optical card 24 when the information is reproduced and for generating the reproduction signal SP; a rotational optical unit ROP which rotates in a plane of rotation that is parallel with a recording surface of the optical card 24 and is used for converging the light beam B emitted from the fixed optical unit SOP onto the optical card 24 and guiding the reflected light of the light beam B from the optical card 24 to the fixed optical unit SOP while rotating; relative position changing means including a feed motor 27 for feeding the optical card 24 put on a tray 25 for holding the optical card 24 to the major side direction of the optical card 24 at a constant speed together with the tray 25, thereby changing a relative positional relation with the rotational optical unit ROP and a conversion gear 26 for changing a rotational motion of the feed motor 27 to a linear motion; and a magnet MG 28 for applying a magnetic field onto the optical card 24 when the information is recorded. Since a construction of the information processing unit is similar to that of the prior art, its detailed explanation is omitted.

The fixed optical unit SOP is constructed by: a laser control unit L for generating a laser driving signal SD to control the light beam B that is emitted from a laser diode 7 on the basis of the recording signal SR; the laser diode 7 for emitting the light beam B on the basis of the laser driving signal SD; a collimator lens 8; a beam splitter 9 for reflecting a part of the light beam B from the laser diode 7 and guiding to a detector 4 to monitor which is included in the laser control unit L, for transmitting the other part of the light beam B and guiding to an actuator 11, which will be described hereinafter, and for reflecting the light beam B reflected by the optical card 24 and guiding to a light receiving unit D, which will be described hereinafter; a relay lens 10 for eliminating optical changes such as a shift of the focal point in cooperation with a lens in the actuctor 11; the actuator 11 including a lens for performing a position adjustment of the light beam such as tracking control, focusing control, and the like for the light beam B and a driving unit of the lens; the light receiving unit D for receiving the light beam B reflected by the beam splitter 9, for forming and generating the reproduction signal SP on the basis of the received light beam B, and for forming and generating signals (error signals) for adjusting a beam position such as focusing error signal, tracking error signal, and the like; a servo circuit 17 for forming a driving signal of the actuator 11 in accordance with the signals for adjusting the beam position; a system controller 5 for generating driving instructions to a laser driving circuit 2 and the servo circuit 17 as necessary; and motor control means 6 for driving a rotary motor 23 so that a rotational speed is set to a predetermined rotational speed by using pulse signals (FG, PG) which are supplied from position signal generating means 18 of the rotational optical unit ROP which will be described hereinafter.

The laser control unit L is constructed by: a recording circuit 1 for performing a modulating process to the recording signal SR, thereby generating a recording control signal SR1; the monitoring detector 4 for receiving the light beam B reflected by the beam splitter 9 and generating a monitor signal SM; an APC (Auto Power Controller) 3 for generating a monitor control signal SR2 to control a power of the light beam B on the basis of the monitor signal SM; and the laser driving circuit 2 for generating the laser driving signal SD to drive the laser diode on the basis of the recording control signal SP1 and monitor control signal SR2 when the driving instruction is generated from the system controller 5.

Figure 3:
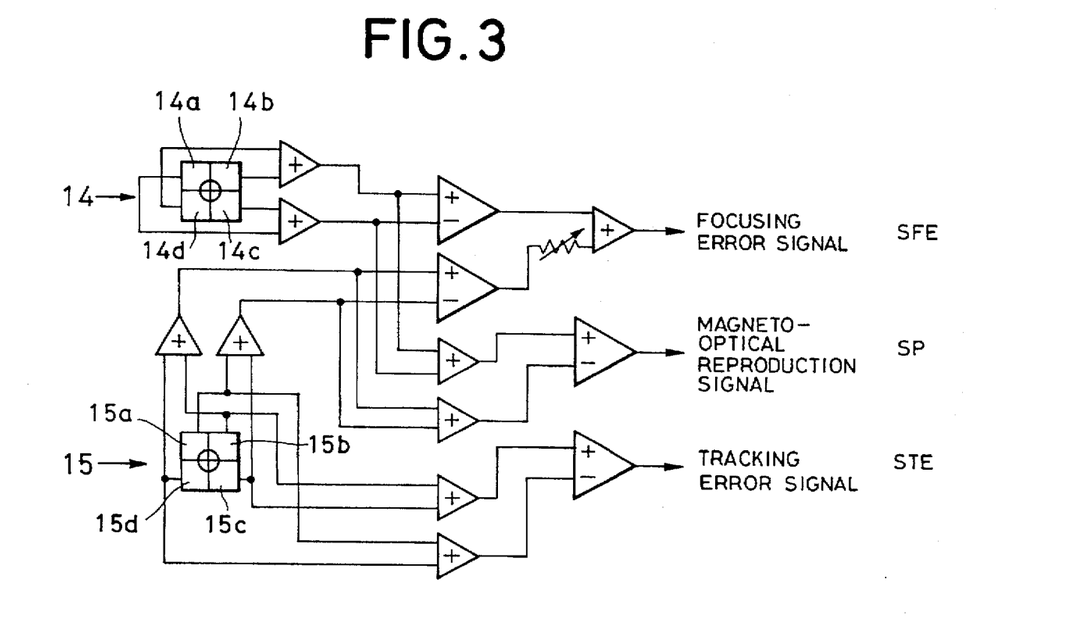
FIG. 3 is a diagram showing a specific example of the structure of the position signal generating means 18 in the first embodiment.

The light receiving unit D is constructed by: a cylindrical lens 12 for giving astigmatism to the reflected light of the light beam B from the optical card 24 reflected by the beam splitter in order to obtain the focusing error signal to be used for a focusing control of the light beam B; a polarization beam splitter (PBS) 13 for transmitting only a polarized light which has a polarizing state and is included in the reflected light of the light beam B to which the astigmatism has been given and for reflecting the other polarized lights; a 4-split detector 15 for receiving the polarized light reflected by the PBS 13; a 4-split detector 14 for receiving the polarized light transmitted by the PBS 13; and a signal forming circuit 16 for forming the reproduction signal SP, tracking error signal, and focusing error signal by, for example, a circuit construction shown in FIG. 3 on the basis of detection signals which are generated from the 4-split detectors 14 and 15. The circuit construction shown in FIG. 3 is a well-known circuit form for eliminating an influence on the focusing error signal by a magnitude of a birefringence that occurs in a magneto-optical material or the like. Since the details of the circuit construction have been disclosed in Japanese Patent Kokai No. 2-230517, a specific explanation is omitted here.

The rotational optical unit ROP is constructed by: reflecting mirrors 19 and 20 serving as light beam guiding means for guiding the light beam B emitted from the fixed optical unit SOP to an objective lens 21 and for forming optical paths to guide the reflected light of the light beam B from the optical card 24 to the fixed optical unit SOP; the objective lens 21 for converging the light beam B onto the recording surface of the optical card 24; a rotary drum 22 for holding the reflecting mirrors 19 and 20 and objective lens 21; the rotary motor 23 for integrally rotating the light beam guiding means and the objective lens 21 through the rotary drum 22; and the position signal generating means 18 for generating a pulse signal as a position signal which is generated synchronously with the rotation of the rotary motor 23 and which indicates a rotational position of the rotary drum.

Figure 2:
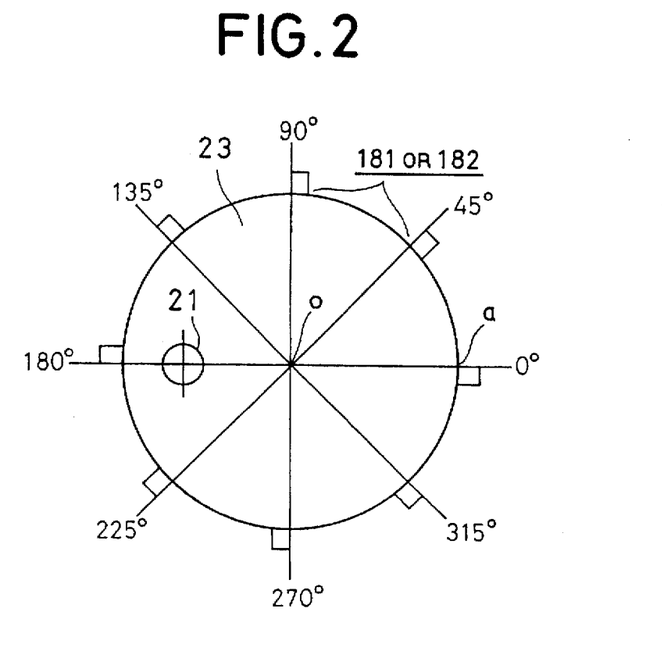
FIG. 2 is a diagram showing a specific circuit example of a signal forming circuit 16 in a light receiving unit D in the first embodiment.

The position signal generating means 18 is constructed by: a first rectangular projecting portion 181 which is arranged at an interval of a first predetermined angle (for example, 45°) in the circumferential direction of the rotary motor 23 by setting an intersection point of a straight line connecting a center of the objective lens 21 and a center of rotation O of the rotary motor 23 and an outer circumferential portion of the rotary motor 23 to a reference point (a) in the outer circumferential portion of the rotary motor 23 as shown in, for example, FIG. 2 and which projects in the radial direction; a second projecting portion 182 (refer to FIG. 1) which is arranged at a second predetermined angle (for example, 360°) from the reference point (a) in the direction of an axis of rotation of the rotary motor 23 for the first projecting portion 181; a photo-coupler 183 which is arranged so as to sandwich the projecting portion 181 in the direction of the axis of rotation; and a photo-coupler 184 which is arranged so as to sandwich the projecting portion 182 in the direction of the axis of rotation. Each of the photo-couplers 183 and 184 comprises a set of a light emitting element and a photosensing element and is fixed to a fixing unit (not shown) irrespective of the rotation of the rotary motor. When the projecting portion 181 or 182 passes through a space between the light emitting element and the photosensing element of the photo-coupler in accordance with the rotation of the motor, therefore, the projecting portion shuts off the light emitted from the light emitting element, so that a pulse signal corresponding to the position of the projecting portion is generated from the photosensing element. For example, now assuming that a first predetermined angle is set to 45° and a second predetermined angle is set to 360°, one pulse signal is derived from the photo-coupler 183 each time the rotary motor 23 rotates by 45°, namely, eight pulse signals are derived each time the rotary motor 23 rotates once. One pulse signal is derived every rotation from the photo-coupler 184. By counting the number of pulse signals (FG) which are generated from the photo-coupler 183 by using a pulse signal (PG) from the photo-coupler 184 as a trigger, consequently, the rotating position of the objective lens 21 can be detected on the basis of a count value.

FIG. 2 is a projection diagram when the rotational optical unit ROP is seen from the optical card side.

The motor control means 6 controls the rotation of the motor so as to set a frequency of the pulse signal to a predetermined frequency by using, for example, the pulse signal which is generated from the photo-coupler 183.

In case of needing more fine position information, it is sufficient to increase the number of projecting portions 181.

A recording and reproducing method of information in the embodiment will now be described.

Figure 4:
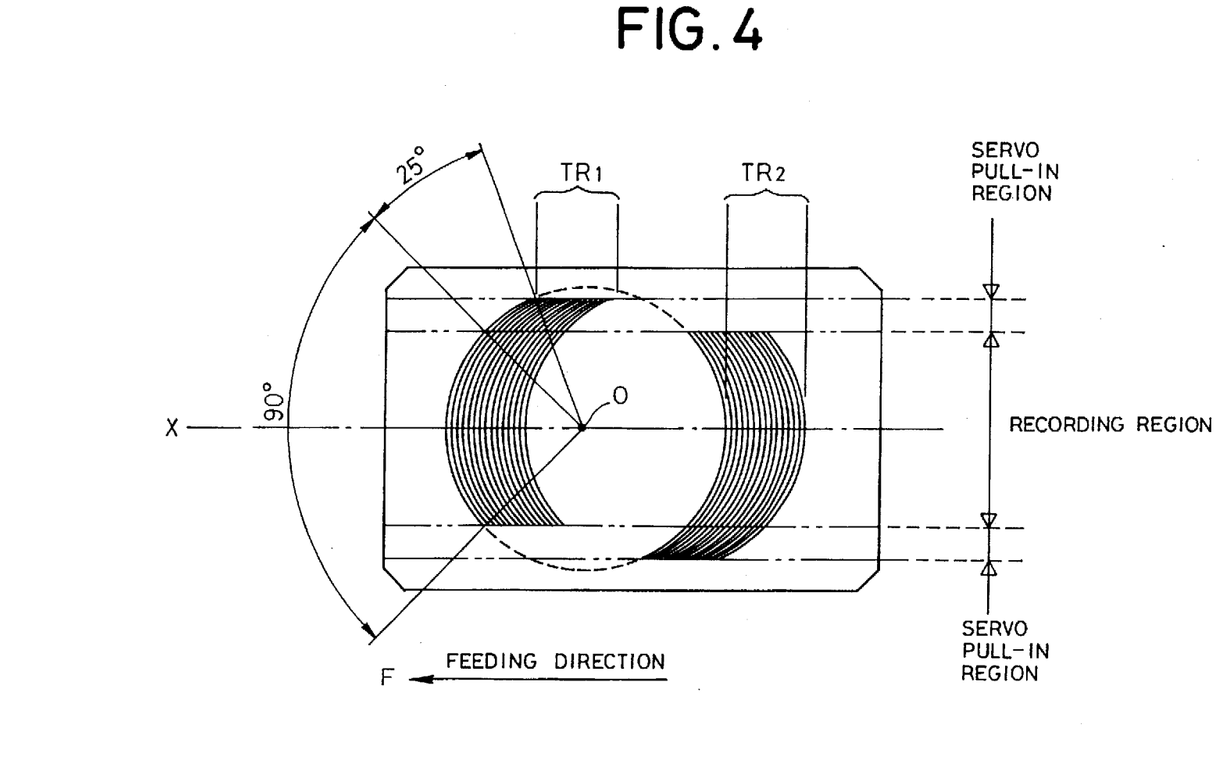
FIG. 4 is a diagram showing arcuated tracks which are formed on an optical card according to the first embodiment.

A feature when recording information in the embodiment is that not only the arcuated recording track is formed on only the feeding direction side of the optical card but also the recording track is formed at the position which faces the recording track by 180° for the center of rotation of the rotational optical unit. Namely, as shown in FIG. 4, when the rotary drum rotates once, in addition to a recording track TR1 which is formed on a feeding direction F side of the optical card, a recording track TR2 is formed at the position that faces the track TR1 by 180° for the center of rotation O. Even when reproducing the information, the apparatus is controlled so as to alternately read the recording tracks TR1 and TR2. In this instance, since a scanning locus of the light beam which is irradiated to the optical card is not concentric circle, a pitch of the recording tracks which are formed in the outer edge portion in the minor side direction of the optical card becomes narrower as it approaches the outer edge portion. Even when information is recorded into such a region, therefore, crosstalk increases upon reproduction and a quality of the reproduction signal is bad. In the embodiment, accordingly, the region which is unsuitable to record the information is used as a servo pull-in region for a tracking control and a focusing control. In the case where a pregroove (guide groove for tracking) or the like is not previously formed on the optical card, namely, in case of the recording system for forming a recording track only by recording information for the first time, it is sufficient that, for example, a peculiar data pattern which doesn't appear as an information signal is recorded into the servo pull-in region upon recording of information.

Figure 5:
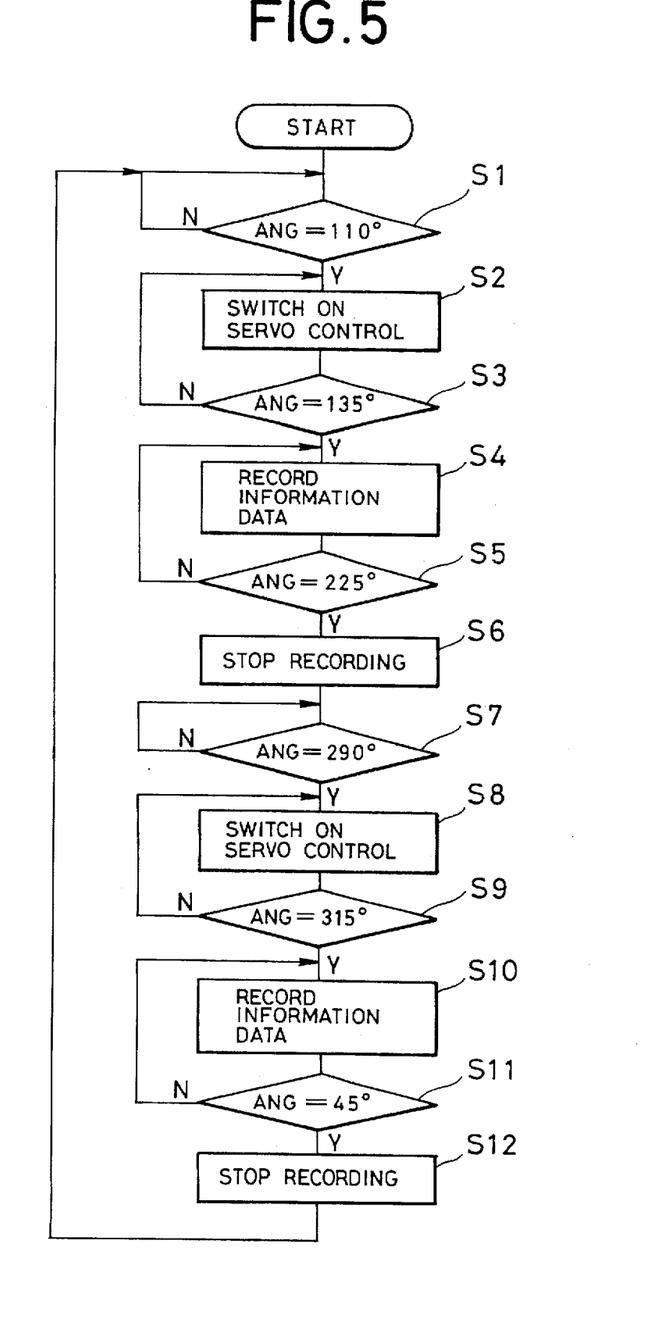
FIG. 5 is a diagram showing an operating flowchart in association with the recording and reproduction of information which are executed by a system controller 5 in the first embodiment.

FIG. 5 shows an operating flow which is executed by the system controller 5 in association with the recording and reproducing operations of information in the embodiment. It is now presumed that the rotating direction of the rotational optical unit is set to the counterclockwise rotation toward the recording surface of the optical card and a recording angle (sector angle in the arcuated track) of information is set to 90° and a recording angle for the servo pull-in region is set to 25°.

Upon recording, on the basis of output signals of position detectors, a check is made to see if a rotational angle of the objective lens is equal to 110° as an absolute angle from the reference point a (S1). When the rotational angle reaches 110°, the objective lens enters the servo pull-in region, so that the system controller 5 transmits an instruction signal to start the servo pull-in operation to the servo control circuit 17 (S2). Subsequently, a check is made to see if the rotational angle is equal to 135° as an absolute angle (S3). When it reaches 135°, an instruction signal to supply a laser power for recording is generated to the laser control circuit (laser driving circuit) 2 (S4). A check is made to see if the rotational angle is equal to 225° as an absolute angle (S5). When it reaches 225°, an instruction signal to stop the recording operation is supplied to the laser driving circuit 2 and an instruction signal to turn off the servo control is supplied to the servo control circuit 17 (S6).

The recording track TR1 is formed by the above operation.

A check is now made to see if the rotational angle is equal to 290° as an absolute angle (S7). When it reaches 290°, since the objective lens enters a second servo pull-in region, an instruction signal to start the servo pull-in operation is supplied to the servo control circuit (S8). A check is further made to see if the rotational angle is equal to 315° as an absolute angle (S9). The servo control is subsequently executed and in order to start the recording operation of information data, an instruction signal to supply a laser power for recording is generated to the laser driving circuit 2 (S10). A check is made to see if the rotational angle is equal to 45° as an absolute angle (S11). When it reaches 45°, an instruction signal to stop the recording operation is supplied to the laser driving circuit 2 and an instruction signal to turn off the servo control is supplied to the servo control circuit 17 (S12).

The recording track TR2 is formed by the above operation.

Since the above operation is executed together with the feeding operation of the optical card by the feed motor 27 and conversion gear 26, by repeating the above operations, a group of spiral recording tracks TR1 and a group of spiral recording tracks TR2 as shown in FIG. 4 are formed.

Upon reproduction, an instruction signal is generated to the laser driving circuit 2 so as to supply a laser power for reproduction when the objective lens reaches the servo pull-in region (135° or 290° as an absolute angle of the rotational angle) in the above operation. When the objective lens reaches a recording region (135° or 315° as an absolute angle of the rotational angle), the read signal detected by the reflected light from the optical card 24 received by the photosensitive devices 14 and 15 is recognized as a reproduction signal SP.

As mentioned above, in the embodiment, since the recording region of total 180° can be assured when the rotary drum rotates once, a transfer efficiency of the recording data can be doubled as compared with the conventional recording method. In case of the same rotational speed, consequently, a transfer rate is also doubled.

Figure 6:
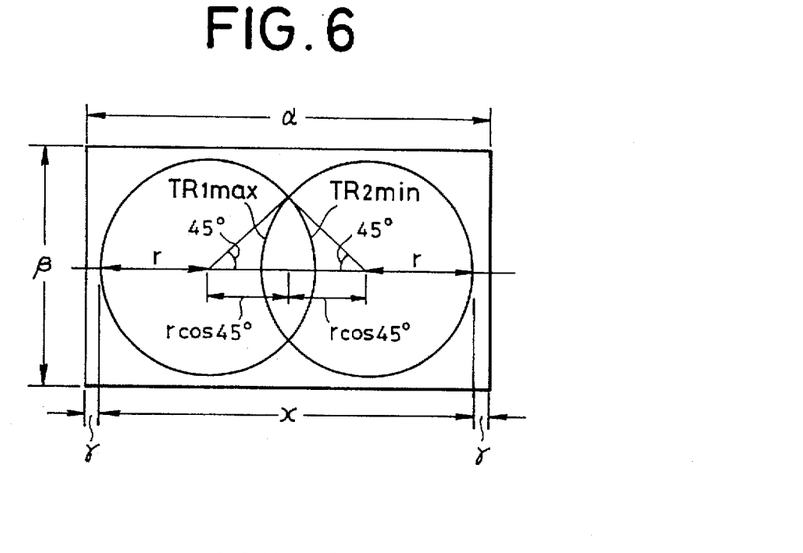
FIG. 6 is a diagram showing conditions which specify an optical radius of a rotational optical unit in the invention.

In the recording and reproducing method as mentioned above, specified conditions of an optical radius (line segment connecting the center of rotation of the rotary drum and the center of the objective lens 21) of the rotary drum 22 in order to obtain the maximum recording capacity for the shape of the recording surface of the optical card 24 will now be described with reference to FIG. 6.

On the recording surface of the optical card 24, it is now assumed that a length in the major side direction of the recording surface is set to $\alpha$, a length in the minor side direction is set to $\beta$, a length of non-recorded region which is unsuitable for recording in an edge portion of the card is set to $\gamma$, and a recording angle is set to 90°. In this case, conditions to obtain an optical radius r of the rotary drum for obtaining the maximum recording capacity are such that a sector angle formed by an intersection point between a track $TR2_{min}$ which is formed when the feed distance of the optical card is minimum and a track $TR1_{max}$ which is formed when the feed distance is maximum is set to the same angle of 90° as the recording angle and that a value (x−2r) can be assured as a feed distance.

Namely, since the condition:

$$2r \times \cos(90°/2) = x - 2r$$

is satisfied, when the rotary drum of:

$$r = [x/(1+\cos 45°)]/2$$

is used, the maximum recording capacity is obtained for the optical card (where, $x = \alpha - 2\gamma$).

In the case where an optical card having certain dimensions is given, therefore, by using the rotational optical unit having the optical radius r which is constructed on the basis of the positional equation in order to have the maximum recording capacity for the optical card, it is sufficient that the relative feed distance between the rotational optical unit and the optical card is set to almost the half of the length in the major side direction of the optical card.

Second embodiment

The second embodiment of the invention will now be described with reference to FIGS. 7 to 9.

In the first embodiment, there has been shown an example in which since the outer edge portion of the optical card (for example, as an absolute value of the rotational angle, ranges of (i) 110° to 135°, (ii) 225° to 250°, (iii) 290° to 315°, and (iv) 45° to 70°) is unsuitable for recording because a track itch is narrow and crosstalk is large, the outer edge (for example, ranges corresponding to the ranges (i) and (iii)) preceding to a data region by the rotational direction of the rotational optical unit is used as a servo pull-in region. The outer edge portions (for example, the ranges of (ii) and (iv)) subsequent to the data region are not used.

In the second embodiment, a recording and reproducing method of also using the unused region as a data region is shown.

Figure 8:
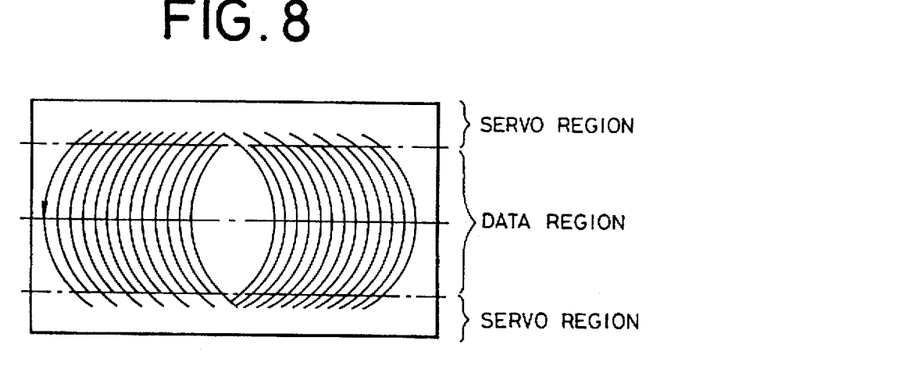
FIG. 8 is a diagram showing arcuated tracks which are formed in an optical card shape in the second embodiment.

FIG. 8 shows a scanning locus which is drawn by a light beam that is irradiated to the optical card in the second embodiment. The reason why the outer edge portion of the optical card is not used is because since the track pitch is narrow and the crosstalk increases, the recording tracks are formed, for example, at a rate of one track per two tracks so that the influence by the crosstalk can be eliminated.

Figure 7:
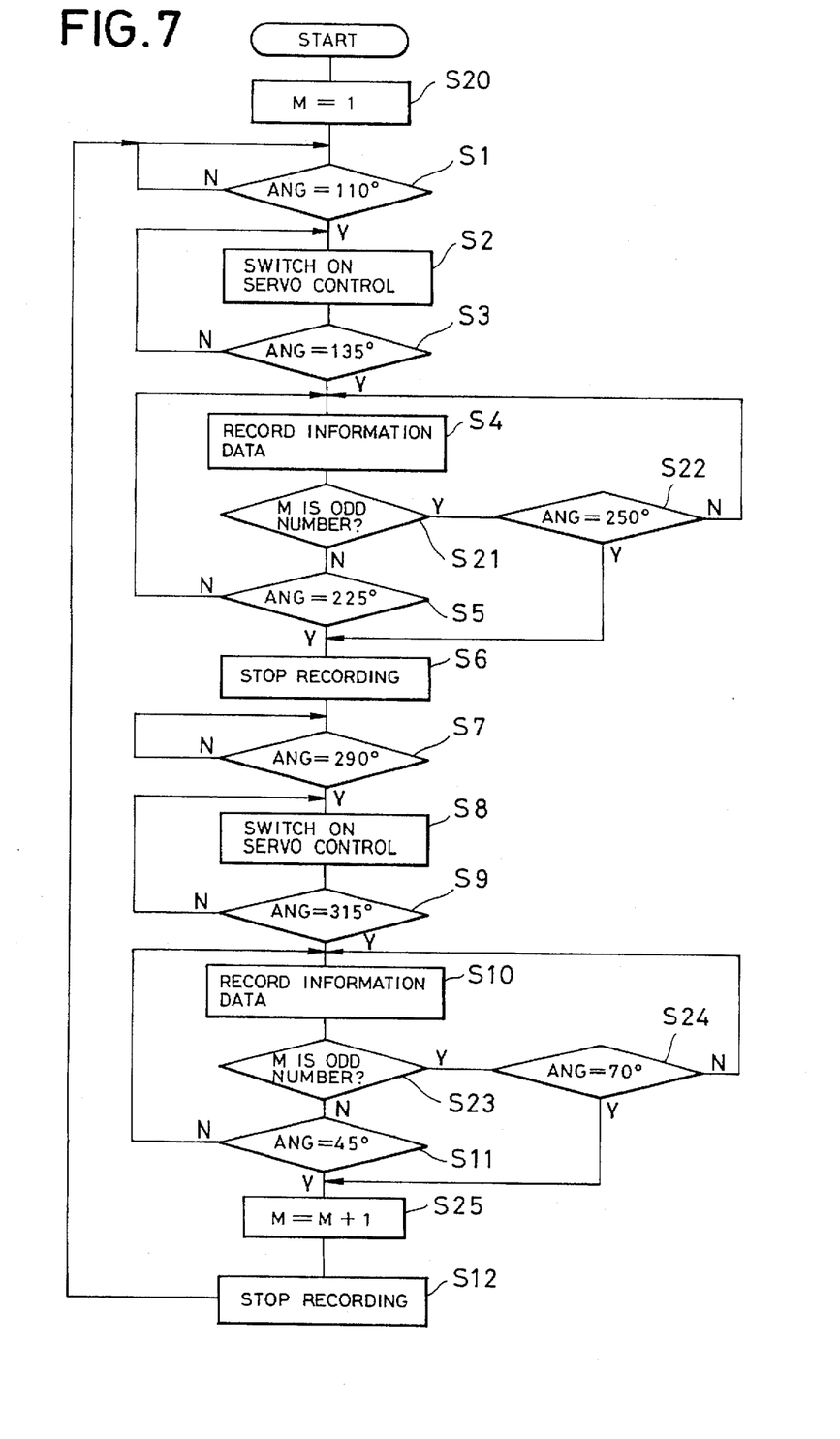
FIG. 7 is an operating flowchart in association with the recording and reproduction of information which are executed by the system controller 5 in the second embodiment.

FIG. 7 shows an operating flowchart upon recording in the second embodiment. In the second embodiment, first, a parameter M for identifying the track is set to an initial value 1 (S20). After it was confirmed that the objective lens had entered the data region by the operations in steps S1 to S4, a check is made in step S21 to see if the parameter M is an odd number or an even number. When it is judged to be an even number in step S21, step S5 follows. The operation in step S4 for recording information is repeated for the data region in the first embodiment. When it is judged in step S21 that the parameter M is an odd number, step S22 follows and the operation in step S4 is repeated so as to record information up to a range of 250° as an absolute value of the rotational angle corresponding to the outer edge portion of the optical card as a data region. Similarly, even in the recording region which faces the data region at an angle of 180°, by the controls based on steps S22 and S23, in case of the recording track corresponding to the parameter M of an odd number, the operation in step S10 is repeated so as to record information up to a range of 70° as an absolute value of the rotational angle.

By the above operation, the scanning locus as shown in FIG. 8 is obtained and the recording capacity can be increased. Although the second embodiment has been shown as an example in which the data region is widened only in the case where the parameter M is an odd number, the invention is not limited to the example. It is also possible to widen the data region in case of an odd number for the former half rotation in one rotation of the rotational optical unit and to widen the data region in case of an even number for the latter half rotation. By alternately widening the data region as mentioned above, a transfer rate of the data per rotation can be made constant.

Figure 9:
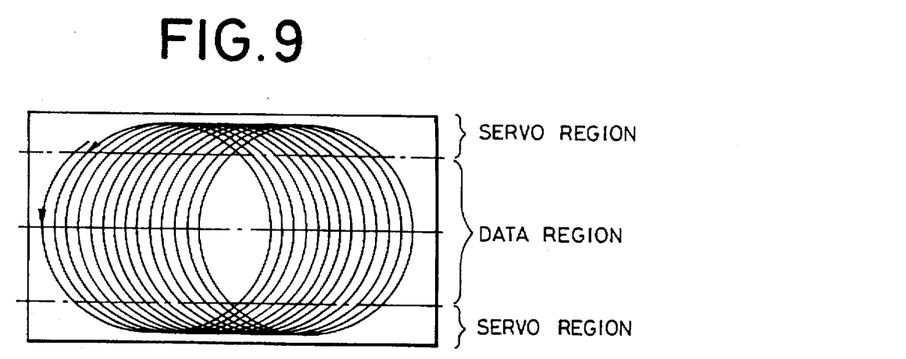
FIG. 9 is a diagram showing circular tracks which are formed in an optical card shape in the second embodiment.

In the first and second embodiments, although the arcuated recording tracks have been formed, when the relations of (α>2r) and (β>2r) are satisfied among the dimension α in the major side direction of the optical card and the dimension β in the minor side direction and the optical radius r of the rotational optical unit, since the light beam always exists on the recording surface, circular recording tracks can be also formed as shown in FIG. 9. By forming the recording tracks as mentioned above, since both of the focusing control and the tracking control can be continuously executed, there are advantages such that a load of the system controller is reduced and a stable servo control can be performed. Since an intersection region of the tracks occurs in the outer edge portion in the minor side direction of the optical card, with respect to the tracking control, in the intersection region, if the operator tries to perform the servo control at the same precision as that of the other region, there is a possibility such that an unstable operation occurring so as to follow an abnormal error signal which occurs due to an interference with the other tracks is caused. In the case where the light beam exists in the intersection region, therefore, it is necessary to perform the control by using the error signal held just before entering the intersection region or to take a measure such as to reduce a servo gain of the tracking control for only the intersection region or the like.

Although the above embodiment has been described with respect to an example in which information is recorded and reproduced to and from the optical card being used by means of the magneto-optical method, the invention is not limited to the example. For example, the invention can be also applied to an apparatus for recording and reproducing information by a phase change method or an apparatus of a write once type or an ROM type using a pigment material or the like.

Third embodiment

In the first and second embodiments, the magnet MG 28 is fixed in such a direction as to apply a polarity of a magnetic field upon recording to the optical card on the side opposite to the objective lens 21 while sandwiching the optical card 24. In case of deleting the information recorded to the optical card, it is necessary to invert the polarity of the magnet by some method.

In the embodiment, a pickup apparatus having an external magnetic field generating means with a construction suitable for miniaturization and a thin size of the apparatus will be described.

Figure 10A:
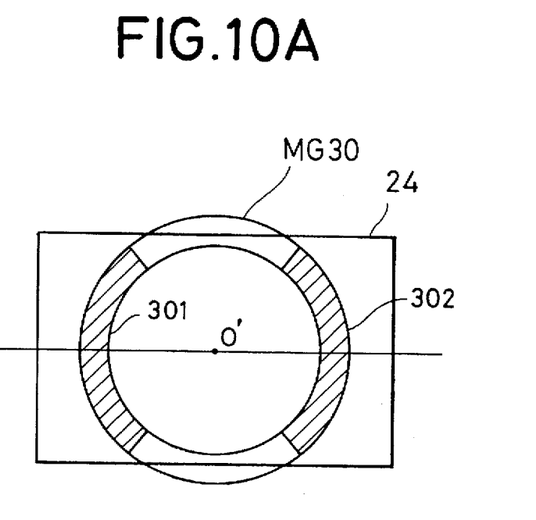
FIG. 10A is a diagram showing the structure of the external magnetic field generating means which is used in the third embodiment and is a schematic diagram of a ring-shaped magnet MG 30.
Figure 10B:
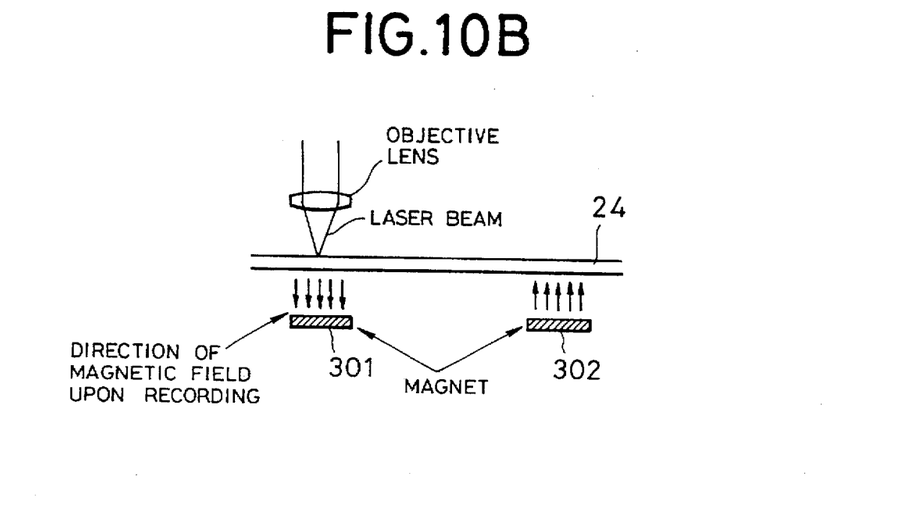
FIG. 10B is a diagram showing the structure of the external magnetic field generating means which is used in the third embodiment and is a diagram showing a positional relation of an objective lens, the optical card, and the ring-shaped magnet.

FIGS. 10A and 10B show a specific diagram of the structure the external magnetic field generating means. FIG. 10A is a projection view when it is seen from the optical card 24 side. FIG. 10B is a cross sectional view thereof.

A center of a circle of a ring-shaped magnet MG 30 is located on the center of rotation of the rotational optical unit ROP in the pickup apparatus of the embodiment. The magnet MG 30 is formed like a ring having a predetermined width including a circumferential line corresponding to the optical radius of the rotational optical unit ROP in the direction that is parallel with the recording surface of the optical card. Magnets 301 and 302 which can supply magnetic fields of opposite polarities to the optical card are arranged so as to have the predetermined ring width at the symmetrical positions with respect to the center of the ring-shaped magnet MG 30. For example, the polarity of the magnetic field which is given by the magnet 301 is set to the polarity upon recording and the polarity which is given by the magnet 302 is set to the polarity upon erasing. As shown in FIG. 10B, when the magnet 301 is arranged at the irradiating position on the recording surface of the light beam which is irradiated through the objective lens 21 so as to have a positional relation which can give a recording magnetic field, the magnet 302 is arranged at the position which faces the magnet 301 at an angle of 180° with respect to a center O' of the circle.

The ring-shaped magnet MG 30 is, further, fitted to a ring-shaped magnet driving motor comprising, for example, a flat type motor (not shown) whose center of a circle is set to a center of rotation or the like. By controlling so as to rotate the ring-shaped magnet driving motor synchronously with a rotational period of the rotational optical unit ROP, the ring-shaped magnet MG 30 is rotated integrally with the rotational optical unit.

In the arrangement relation shown in FIG. 10, therefore, since the magnet 301 is also rotated integrally with the rotation of the light beam, a recording magnetic field is always applied to the irradiating position of the light beam. Upon erasing, it is sufficient to construct in a manner such that only the ring-shaped magnet MG 30 is rotated by 180° and the system is reconstructed so that the magnetic field from the magnet 302 is applied to the irradiating position on the recording surface of the light beam and, after that, the ring-shaped magnet MG 30 is rotated integrally with the rotation of the light beam.

According to the embodiment as mentioned above, the ring-shaped magnet MG 30 in which the magnets having the opposite polarities are arranged on the same surface at the positions which face each other at an angle of 180° with respect to the center of the circle is used and is rotated integrally with the rotational optical unit ROP, so that the polarity inversion of the magnets which is necessary upon recording and erasing can be operated on the same plane and the miniaturization and thin size can be realized.

For example, in the positional relation between the objective lens and the ring-shaped magnet MG 30 shown in FIGS. 10A and 10B, in the case where the directions of the magnetic fields of the opposite polarities which are given by the magnets 301 and 302 can be determined to the direction of the magnetic field of the optical card at that location, it is sufficient to fix the ring-shaped magnet MG 30 to a state of FIGS. 10A and 10B. The construction can be, consequently, simplified by only a degree corresponding to that a mechanism to perform the rotation synchronized with the rotational optical unit ROP is unnecessary.

In this case, in case of erasing the recording contents of the optical card, it is sufficient to merely reverse the direction when the optical card is put onto the tray 25 to the direction opposite to the direction upon recording.

As described above, according to the invention, since the length of the line segment connecting the center of rotation of the rotational optical unit and the center of the objective lens is specified on the basis of the length in the major side direction of the recording surface and the value $(1+\cos\theta/2)$ when the recording angle is $\theta$, the optimum rotational radius is achieved for the particular size of optical card. A using efficiency of the optical card can be improved and the apparatus can be miniaturized.

Since the light beam is irradiated when the objective lens in the rotational optical unit exists in the range of the predetermined recording angle at the recording surface of the optical card and in the range of the angle which is symmetrical with the predetermined recording angle for the center of rotation of the rotational optical unit, a transfer efficiency of the data per rotation of the rotational optical unit can be improved. In case of the same rotational speed, consequently, a transfer speed of the data can be raised.

Further, the servo control circuit for adjusting the position of the light beam is adjusted to a predetermined servo gain when the objective lens in the rotational optical unit exists in the range of the predetermined recording angle at the recording surface of the optical card and in the range of the angle which is symmetrical with the predetermined recording angle for the center of rotation of the rotational optical unit. For example, when the circular recording tracks are formed, therefore, even if the gain is reduced in order to reduce a sensitivity of the servo in the intersecting portion of the recording track or the error signal just before entering the intersecting portion is held, in the region where the information is recorded, since the sensitivity is returned to the original sensitivity, so that the servo control is continuously performed. The servo, consequently, can be stabilized.

What is claimed is:

1. A pickup apparatus of an optical card comprising:

a fixed optical unit;

an objective lens for converging a light beam for recording and reproducing information emitted from said fixed optical unit onto an almost rectangular recording surface of a card-shaped recording medium;

light beam guiding means for guiding said light beam to said recording surface through said objective lens and for guiding a reflected light of said light beam from said recording surface to said fixed optical unit;

a rotational optical unit which is rotated in a manner such that said objective lens and said light beam guiding means are rotated integrally and a line perpendicular to said recording surface is set to a center of rotation, said rotational optical unit forming a pair of recording tracks for each rotation of said objective lens, the pair of recording tracks occupying angular sectors on the recording surface that are symmetric about the center of rotation; and relative position changing means for changing a positional relation of said recording surface and said center of rotation along the major side direction on said rectangular recording surface, wherein when a recording angle on said recording surface is set to $\theta$, a length of a line segment connecting the center of said objective lens and said center of rotation of the rotational optical unit is determined on the basis of a length in said major side direction on the recording surface and $(1+\cos\theta/2)$.

2. A pickup apparatus of an optical card comprising:

a fixed optical unit including beam forming means for forming a light beam for recording and reproducing information in accordance with a control signal;

an objective lens for converging said light beam emitted from said fixed optical unit onto an almost rectangular recording surface of a card-shaped recording medium;

light beam guiding means for guiding said light beam to said recording surface through said objective lens and for guiding a reflected light of said light beam from said recording surface to said fixed optical unit;

a rotational optical unit which is rotated in a manner such that said objective lens and said light beam guiding means are rotated integrally and a line in a portion near a center of the minor side direction on said recording surface and perpendicular to said recording surface is set as a center of rotation;

relative position changing means for changing a positional relation of said recording surface and said center of rotation along the major side direction on said rectangular recording surface;

position detecting means for detecting a rotating position of said rotational optical unit; and control means for forming said light beam by said control signal when said position detecting means detects that said rotating position of the rotational optical unit exists within a range of a predetermined angle and detects that said rotating position exists within a range of an angle symmetrical with said predetermined angle for said center of rotation.

3. A pickup apparatus of an optical card comprising:

means for forming a light beam for recording and reproducing information;

a fixed optical unit including servo control means for adjusting a beam position of said light beam on an almost rectangular recording surface of a card-shaped recording medium;

an objective lens for converging said light beam emitted from said fixed optical unit onto said recording surface;

light beam guiding means for guiding said light beam to said recording surface through said objective lens and for guiding a reflected light of said light beam from said recording surface to said fixed optical unit;

a rotational optical unit which is rotated in a manner such that said objective lens and said light beam guiding means are rotated integrally and a line in a portion near the center in the minor side direction on said recording surface and perpendicular to said recording surface is set as a center of rotation;

relative position changing means for changing a positional relation of said recording surface and said center of rotation along the major side direction on said rectangular recording surface; and position detecting means for detecting a rotating position of said rotational optical unit, wherein when at least said position detecting means detects that said rotating position of the rotational optical unit exists within a range of a predetermined angle and detects that said rotating position exists within a range of an angle symmetrical with said predetermined angle for said center of rotation, said servo control means is adjusted to a predetermined servo gain.

4. An apparatus according to claim 3, wherein said card-shaped recording medium has a servo pull-in region in the minor side direction on said rectangular recording surface and said servo control means performs a pull-in operation of the servo in said servo pull-in region.

5. An apparatus according to claim 3, wherein said servo control means is focusing servo means for performing a focusing control to said recording surface of said light beam.

6. An apparatus according to claim 3, wherein said servo control means is tracking servo means for controlling a tracking to an information track on said recording surface of said light beam.

* * * * *